(12) United States Patent
Mistry et al.

(10) Patent No.: US 6,559,292 B1
(45) Date of Patent: May 6, 2003

(54) DISAZO DYES AND INKS CONTAINING THEM

(75) Inventors: Prahalad Manibhai Mistry, Blackley (GB); Roy Bradbury, Blackley (GB)

(73) Assignee: Avecia Limited, Blackley (GB)

( * ) Notice: Subject to any disclaimer, the term of this patent is extended or adjusted under 35 U.S.C. 154(b) by 0 days.

(21) Appl. No.: 09/869,464

(22) PCT Filed: Jan. 11, 2000

(86) PCT No.: PCT/GB00/00054

§ 371 (c)(1),
(2), (4) Date: Jun. 28, 2001

(87) PCT Pub. No.: WO00/43450

PCT Pub. Date: Jul. 27, 2000

(30) Foreign Application Priority Data

Jan. 21, 1999 (GB) ............................................... 9901427
Sep. 7, 1999 (GB) ............................................... 9921079

(51) Int. Cl.⁷ ........................... C09B 29/30; C09D 11/02
(52) U.S. Cl. ..................... 534/829; 534/836; 106/31.52
(58) Field of Search ................................. 534/829, 836; 106/31.52

(56) References Cited

FOREIGN PATENT DOCUMENTS

| EP | 0 656 407 | 6/1995 |
|---|---|---|
| JP | 6-220377 | 8/1994 |

*Primary Examiner*—Fiona T. Powers

(74) *Attorney, Agent, or Firm*—Pillsbury Winthrop LLP

(57) ABSTRACT

Compounds of Formula (1) and salts thereof:

Formula (1)

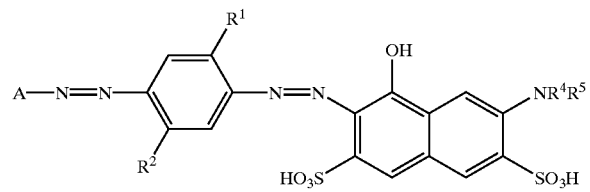

wherein:

A is optionally substituted phenyl;

$R^1$ and $R^2$ are each independently optionally substituted alkyl or optionally substituted alkoxy; and $R^4$ and $R^5$ are each independently H, optionally substituted alkyl or optionally substituted aryl;

provided that (i) at least one of $R^1$ and $R^2$ carries an —OH group; and (ii) A is not of the formula:

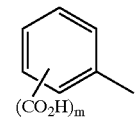

wherein m is 1, 2 or 3.

The compounds are useful as dyes for ink jet printing inks.

11 Claims, No Drawings

DISAZO DYES AND INKS CONTAINING THEM

This application is the National Phase of International Application PCT/GB00/00054 filed Jan. 11, 2000 which designated the U.S. and that International Application was published under PCT Article 21(2) in English.

This invention relates to compounds suitable for use as dyes, to inks and to their use in ink jet printing ("IJP"). IJP is a non-impact printing technique in which droplets of ink are ejected through a fine nozzle onto a substrate without bringing the nozzle into contact with the substrate.

There are many demanding performance requirements for dyes and inks used in IJP. For example they desirably provide sharp, non-feathered images having good water-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

According to the present invention there is provided a compound of Formula (1) and salts thereof:

Formula (1)

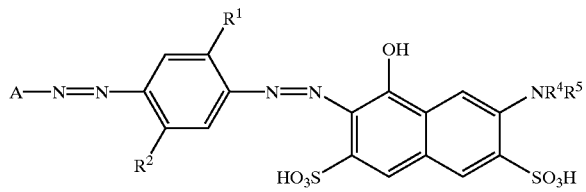

wherein:

A is optionally substituted phenyl;

$R^1$ and $R^2$ are each independently optionally substituted alkyl or optionally substituted alkoxy; and $R^4$ and $R^5$ are each independently H, optionally substituted alkyl or optionally substituted aryl;

provided that (i) at least one of $R^1$ and $R^2$ carries an —OH group; and (ii) A is not of the formula:

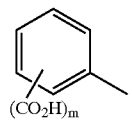

wherein m is 1, 2 or 3.

Preferably A is phenyl carrying one or two substituents.

The optional substituents which may be present on A are preferably selected from —OH; optionally substituted amino, especially —NH$_2$; halo, especially Cl, Br and F; ester, especially —CO$_2$—C$_1$-alkyl; —CN; —NO$_2$; optionally substituted alkyl; optionally substituted alkoxy; —CO$_2$H; —SO$_3$H; —SO$_2$NR$^3$R$^3$; —OR$^3$; or —SR$^3$; wherein each R$^3$ independently is H or C$_{1-4}$-alkyl. Especially preferred optional substituents for A are selected from optionally substituted C$_{1-4}$-alkyl and optionally substituted C$_{1-4}$-alkoxy, the preferred optional substituents being selected from carboxylic acid, sulphonic acid and phosphoric acid.

$R_1$ and $R^2$ are preferably each independently optionally substituted C$_{1-4}$-alkyl or C$_{1-4}$-alkoxy, more preferably optionally substituted C$_{1-4}$-alkoxy, provided that at least one of $R_1$ and $R^2$ carries an —OH group. The optional substituents which may be present on R$^1$, R$^2$, R$^4$ and R$^5$ are preferably selected from —NH$_2$; halo, especially Cl, Br and F; ester, especially —CO$_2$—C$_{1-4}$-alkyl; —O—C$_{1-4}$-alkyl; —CO$_2$H; —SO$_3$H; —OR$^3$; or —SR$^3$; wherein each R$^3$ independently is H or C1-4-alkyl, provided that at least one of R$^1$ and R$^2$ carries an —OH group.

Preferably both $R_1$ and $R^2$ carry an —OH group.

Preferably $R^4$ and $R^5$ are each independently H, optionally substituted C$_{1-4}$-alkyl or optionally substituted phenyl, more preferably H, or C$_{1-4}$-alkyl or phenyl carrying 1 or 2 groups selected from carboxy and sulpho. More preferably $R^4$ and $R^5$ are both H.

The compounds of Formula (1) may be prepared by diazotising a compound of the Formula (2) to give a diazonium salt and coupling the resultant diazonium salt with a 1-hydroxy-3,6-disulpho-7-aminonaphthalene:

Formula (2)

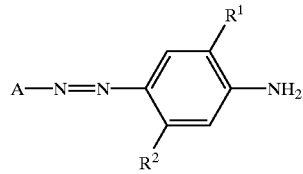

wherein A, $R^1$ and $R^2$ are as hereinbefore defined.

The hydroxy group(s) on $R^1$ and/or $R^2$ may be protected during the diazotisation, for example using an acid labile or base labile protecting group. The acetoxy protecting group is particularly convenient and inexpensive.

The diazotisation is preferably performed at a temperature below 6° C., more preferably at a temperature in the range −10° C. to 5° C. Preferably the diazotisation is performed in water, preferably at a pH below 7. Dilute mineral acid, e.g. HCl or H$_2$SO$_4$, may be used to achieve the desired acidic conditions.

The compound of Formula (2) may be prepared by diazotising a compound of formula A—NH$_2$ and coupling onto an aniline compound carrying $R^1$ and $R^2$ groups at the 2- and 5- positions respectively, wherein A, $R^1$ and $R^2$ are as hereinbefore defined.

Preferred salts are alkali metal salts (especially lithium, sodium and potassium salts), ammonium and substituted ammonium salts and mixtures thereof. Especially preferred salts are sodium, potassium and lithium salts, salts with ammonia and volatile amines and mixtures thereof. The lithium salts have good solubility, forming particularly storage stable inks with low toxicity and low tendency to block ink jet nozzles.

The compounds may be converted into a desired salt using known techniques. For example, an alkali metal salt of a compound may be converted into the ammonium or substituted ammonia salt by dissolving an alkali metal salt of the compound in water, acidifying with a mineral acid and adjusting the pH of the solution to pH 9 to 9.5 with ammonia or the amine and removing the alkali metal cations by dialysis or by use of an ion exchange resin.

Examples of amines which may be used to form such salts include methylamine, dimethylamine, trimethylamine, tetramethylamine, ethylamine, n-propylamine, iso-propylamine, n-butylamine, iso-butylamine, sec-butylamine, tert-butylamine, piperidine, pyridine, morpholine, allylamine, diethylamine, triethylamine and mixtures thereof. It is not essential that the dyes are completely in the form of the ammonium salt or substituted ammonium salt and mixed alkali metal and either ammonium salt or substituted ammonium salt are effective, especially those in which at least 50% of the cations are ammonium or substituted ammonium ions.

Still further salts are those with the counter ions described in U.S. Pat. No. 5,830,265, claim 1, integer (b), which are included herein by reference thereto.

The compounds of Formula (1) may exist in tautomeric forms other than those shown in this specification. These tautomers are included within the scope of the present claims.

According to a second aspect of the present invention there is provided an ink comprising a compound of Formula (1) or salt thereof and a liquid medium or a low melting point solid medium.

A preferred ink comprises:
(a) from 0.01 to 30 parts of a compound of the Formula (1) or salt thereof; and
(b) from 70 to 99.99 parts of a liquid medium or a low melting point solid medium;
wherein all parts are by weight and the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

When the medium is a liquid, preferably component (a) is completely dissolved in component (b). Preferably component (a) has a solubility in component (b) at 20° C. of at least 10%. This allows the preparation of liquid dye concentrates which may be used as an ink or to prepare inks and reduces the chance of the dye precipitating if evaporation of the liquid medium occurs during storage.

Preferred liquid media include water, a mixture of water and an organic solvent and an organic solvent free from water.

When the liquid medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-soluble organic solvents are cyclic amides, especially 2-pyrrolidone, N-methyl-pyrrolidone and N-ethyl-pyrrolidone; diols, especially 1,5pentane diol, ethyleneglycol, thiodiglycol, diethyleneglycol and triethyleneglycol; and mono- $C_{1-4}$-alkyl and $C_{1-4}$-alkyl ethers of diols, more preferably mono- $C_{1-4}$-alkyl ethers of diols having 2 to 12 carbon atoms, especially ((2-methoxy)-2-ethoxy)-2-ethoxyethanol.

Examples of further suitable ink media comprising a mixture of water and one or more organic solvents are described in U.S. Pat. No. 4,963,189, U.S. Pat. No. 4,703,113, U.S. Pat. No. 4,626,284 and EP 4,251,50A.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the dye in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) &/or an alcohol (especially a $C_{1-4}$-alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Ink media comprising an organic solvent free from water are particularly useful where fast drying times are required and particularly when printing onto hydrophobic and non-absorbent substrates, for example plastics, metal and glass.

Preferred low melting solid media have a melting point in the range from 60° C. to 125° C. Suitable low melting point solids include long chain fatty acids or alcohols, preferably those with $C_{18-24}$ chains, and sulphonamides. The compounds of Formula (1) may be dissolved in the low melting point solid or may be finely dispersed in it.

The compounds of the invention may be used as the sole colorant in inks because of their attractive black shade. However, if desired, one may combine the dyes with one or more further colorants if a slightly different shade is required for a particular end use. The further colorants are preferably dyes. When further colorants are included in the ink these are preferably selected from black, cyan and yellow colorants and combinations thereof.

Preferred black colorants include C.I.Food Black 2, C.I.Direct Black 19, C.I.Reactive Black 31, PRO-JET Fast Black 2, C.I.Direct Black 195; C.I.Direct Black 168; and black dyes described in patents by Lexmark (e.g. EP 0 539,178 A2, Example 1, 2, 3, 4 and 5), Orient Chemicals (e.g. EP 0 347 803 A2, pages 5–6, azo dyes 3, 4, 5, 6, 7, 8, 12, 13, 14, 15 and 16) and Seiko Epson Corporation.

Preferred cyan colorants include C.I.Direct Blue 199; C.I.Acid Blue 9; C.I.Direct Blue 307; C.I.Reactive Blue 71; and C.I.Direct Blue 85.

Preferred yellow colorants include C.I.Direct Yellow 142; C.I.Direct Yellow 132;

C.I.Direct Yellow 86; C.I.Direct Yellow 85; and C.I.Acid Yellow 23.

However, as mentioned above, it is not normally necessary to use further colorants in conjunction with dyes of the present invention.

The ink may also contain additional components conventionally used in ink jet printing inks, for example viscosity and surface tension modifiers, corrosion inhibitors, biocides, kogation reducing additives and surfactants which may be ionic or non-ionic.

A further aspect of the invention provides a process for printing an image on a substrate comprising applying an ink containing a compound of Formula (1) to the substrate by means of an ink jet printer.

The ink used in this process is preferably as defined in the second aspect of the present invention.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink jet printers the oscillation of a small crystal causes ejection of the ink from the orifice.

The substrate is preferably paper, plastic, a textile, metal or glass, more preferably paper, an overhead projector slide or a textile material, especially paper.

Preferred papers are plain or treated papers which may have an acid, alkaline or neutral character.

Preferred papers are plain or treated papers which may have an acid, alkaline or neutral character. Examples of commercially available treated papers include HP Premium Coated Paper (available from Hewlett Packard Inc.), HP Photopaper (available from Hewlett Packard Inc.), Stylus Pro 720 dpi Coated Paper, Epson Photo Quality Glossy Film (available from Seiko Epson Corp.), Epson Photo Quality Glossy Paper (available from Seiko Epson Corp.), Canon HR 101 High Resolution Paper (available from Canon), Canon GP 201 Glossy Paper (available from Canon), and Canon HG 101 and HG201 High Gloss Film (available from Canon).

A further aspect of the present invention provides a paper, an overhead projector slide or a textile material printed with an ink, a compound or by means of a printing process as hereinbefore defined.

A still further as aspect of the present invention provides an ink jet printer cartridge, optionally refillable, containing an ink according to the second aspect of the present invention.

The following examples illustrate how compounds according to the invention may be synthesised.

The compounds and inks of the invention have attractive, neutral black shades and are particularly well suited for the ink jet printing of text and images. The inks have good storage stability and low tendency to block the very fine nozzles used in ink jet printers. Furthermore, the resultant images have good optical density, light-fastness, wet-fastness and resistance to fading in the presence of oxidising air pollutants.

The invention is further illustrated by the following examples in which all parts and percentages are by weight unless specified otherwise.

EXAMPLE 1

Preparation of

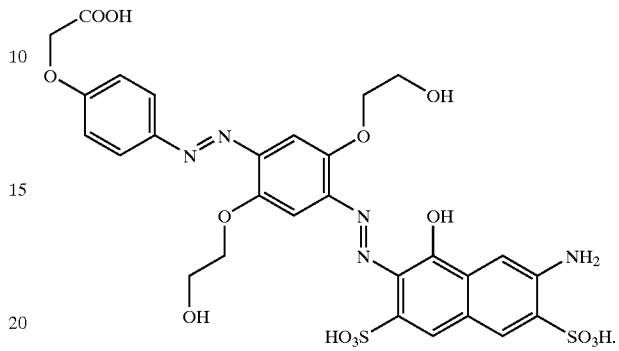

Step 1—Preparation of 4-Aminophenoxyacetic Acid

4-Acetylaminophenol (302 g) and sodium hydroxide (80 g) were dissolved in water (1500 ml) and sodium chloroacetate (500 g) was added slowly, followed by sodium carbonate (200 g). After refluxing overnight and then cooling to room temperature the product was isolated by filtration. The crude product was purified by washing with acetone (3×3000 ml) to remove unreacted starting material. After drying at 50° C. the solid was stirred in hydrochloric acid (4000 ml, 2M) at 70–80° C. until hydrolysis was complete. After adjusting the pH to 4–5 with sodium hydroxide the precipitated product was filtered- off and washed with acetone (2000 ml). The yield of 4-aminophenoxyacetic acid was 262 g.

Step 2—Preparation of 1,4-di-(2-Acetoxyethoxy) hydroquinone

Hydroquinone bis-(2-hydroxyethyl)ether (179 g), acetic acid (1000 ml) and acetic anhydride (300 ml) were stirred and heated under reflux overnight. After cooling to room temperature and drowning into water (2 l) the product was isolated by filtration, washed with water, dried and recrystallised from ethanol to give 212 g of product.

Step 3—Preparation of 2-Nitro-1,4-di-(2-Acetoxyethyoxy) hydroquinone

The product of step 2 (211.5 g) was dissolved in acetic acid (1800 ml). A mixture of nitric acid (51.9 ml) and acetic acid (200 ml) was then added over 20 minutes keeping the temperature below 20° C. After stirring at room temperature overnight the solution was drowned into water (9000 ml) and the product isolated by filtration, washed with water and recrystallised from ethanol to give 209 g of product.

Step 4—Preparation of 2,5-di-(2-Acetoxyethoxy)aniline

The product of step 3 (115 g) was dissolved in ethanol at 50° C. and reduced with hydrogen in the presence of palladium catalyst (2 g, 5% Pd/C). When uptake of hydrogen ceased the solution was screened to remove the catalyst and the filtrates allowed to cool to room temperature. The crystalline solid was isolated by filtration and dried under vacuum to give 90 g of product.

Step 5—Preparation of 4-(4-Carboxymethoxyphenyl)azo-2,5-di-(2-Acetoxyethoxy)aniline 4-Aminophenoxyacetic acid (10.02 g) prepared as described in step 1 was stirred in water (300 ml) and hydrochloric acid (20 ml). After cooling below 10° C., sodium nitrite (4.55 g) was added slowly. After stirring for a further hour, excess nitrous acid was destroyed using sulphamic acid to give a diazonium salt solution.

2,5-di-(2-acetoxyethoxy)aniline (17.82 g) was dissolved in acetone (500 ml) and added to the above diazonium salt solution. After stirring overnight at room temperature the precipitated product was filtered-off, washed with water and used without further purification.

Step 6—Preparation of the Title Product

The product of step 5 was dissolved in water by raising to pH9. Sodium nitrite (8.28 g) was added and the mixture added to a mixture of water (100 ml) and hydrochloric acid (20 ml). After stirring for 1 hour at room temperature excess nitrous acid was destroyed by sulphamic acid.

1-Hydroxy-3,6-disulpho-7-aminonaphthalene (16.2 g) was dissolved in water (300 ml) and the pH raised to 10 by addition of sodium hydroxide solution (2M). After cooling below 10° C., sodium carbonate (10 g) was added. The diazonium salt solution prepared as described in the previous paragraph was then added slowly, maintaining the pH at 10.5–11. After stirring for 1 hr, sodium hydroxide (120 g) was added and the solution heated to 60–65° C. for 2 hrs. The pH was adjusted to 7 and ammonium chloride (15% w/v) added to precipitate the dye which was isolated by filtration at 70° C. The isolated solid was washed with hot ammonium chloride solution (20% w/v) and pulled dry on the filter. After conversion to the free acid the black dye was re-dissolved in ammonia solution and dialysed to low conductivity. The title product in the form of its ammonium salt was isolated by evaporating the water at 50° C.

EXAMPLE 2

Preparation of

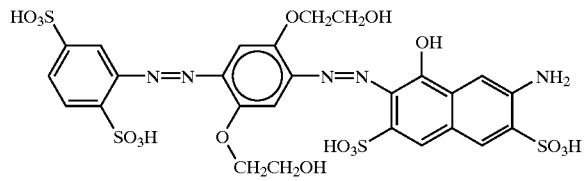

Example 1 was repeated except that in place of 4-aminophenoxyacetic acid there was used 2,5-disulphoaniline.

EXAMPLE 3

Preparation of

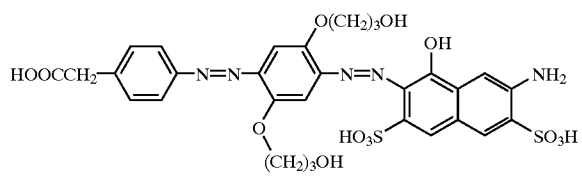

Example 1 was repeated except that in place of 1,4-di-(2-acetoxyethoxy)hydroquinone there was used 1,4-di-(3-acetoxypropoxy)hydroquinone and in place of 4-aminophenoxyacetic acid there was used 4-aminophenylacetic acid.

EXAMPLE 4

Preparation of

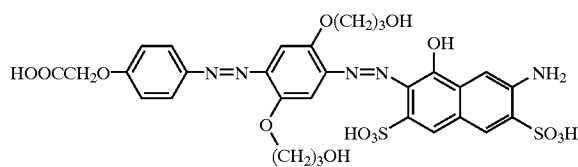

Example 1 was repeated except that in place of 1,4-di-(2-acetoxyethoxy)hydroquinone there was used 1,4-di-(3-acetoxypropoxy)hydroquinone.

EXAMPLE 5

Preparation of

Example 1 was repeated except that in place of 1,4-di-(2-acetoxyethoxy)hydroquinone there was used 1,4-di-(2,3-diacetoxypropoxy)hydroquinone.

EXAMPLE 6–15

Mixtures

The dye mixtures described in Table A may be prepared in which all parts are by weight and are shown in brackets. CID means C.I.Direct, CIR means C.I.Reactive and CIA means C.I.Acid.

TABLE A

| Example | 6 | 7 | 8 | 9 | 10 | 11 | 12 | 13 | 14 | 15 |
|---|---|---|---|---|---|---|---|---|---|---|
| Dye from Example No. | 1(80) | 2(90) | 3(60) | 4(75) | 5(95) | 1(92) | 2(89) | 3(81) | 4(60) | 5(77) |
| CID Yellow 132 | (10) | | | | | | | | (4) | (7) |
| CID Yellow 142 | | (10) | | (5) | | | | | | |
| CID Yellow 86 | | | | (5) | | | | | | (6) |
| CIA Yellow 23 | | | (10) | | | | | | | (10) |
| CIA Blue 9 | | | | | (5) | | | | | |
| CIA Blue 307 | | | | | | (8) | | | | |
| CID Black 168 | | | | | | | (11) | | | |
| CI Food Black 2 | (10) | | | | | | | | (20) | |
| CID Black 19 | | | (30) | | | | | (15) | (20) | |

Inks

The inks described in Tables I and II may be prepared wherein the Dye described in the first column is the Dye or mixture made in the above example of the same number. Numbers quoted in the second column onwards refer to the number of parts of the relevant ingredient and all parts are by weight. The inks may be applied to paper by thermal or piezo ink jet printing.

The following abbreviations are used in Table I and II:

P12=propane-1,2-diol

BDL=butane-2,3-diol

CET=cetyl ammonium bromide

PHO=$Na_2HPO_4$ and

TBT=tertiary butanol

TDG=thiodiglycol

TABLE I

| Dye/Mixture | Dye/Mixture Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 |   | 6 | 4 |   |   |   |   | 5 |   |
| 2 | 3.0 | 90 |   | 5 | 5 |   | 0.2 |   |   |   |   |   |
| 3 | 10.0 | 85 | 3 |   | 3 | 3 |   |   |   | 5 | 1 |   |
| 4 | 2.1 | 91 |   | 8 |   |   |   |   |   |   |   | 1 |
| 5 | 3.1 | 86 | 5 |   |   |   |   | 0.2 | 4 |   |   | 5 |
| 6 | 1.1 | 81 |   |   | 9 |   | 0.5 | 0.5 |   |   | 9 |   |
| 7 | 2.5 | 60 | 4 | 15 | 3 | 3 |   |   | 6 | 10 | 5 | 4 |
| 8 | 5 | 65 |   | 20 |   |   |   |   | 10 |   |   |   |
| 9 | 2.4 | 75 | 5 | 4 |   | 5 |   |   |   | 6 |   | 5 |
| 10 | 4.1 | 80 | 3 | 5 | 2 | 10 |   | 0.3 |   |   |   |   |
| 11 | 3.2 | 65 |   | 5 | 4 | 6 |   |   | 5 | 4 | 6 | 5 |
| 12 | 5.1 | 96 |   |   |   |   |   |   |   | 4 |   |   |
| 13 | 10.8 | 90 | 5 |   |   |   |   |   | 5 |   |   |   |
| 14 | 10.0 | 80 | 2 | 6 | 2 | 5 |   |   | 1 |   | 4 |   |
| 15 | 1.8 | 80 |   | 5 |   |   |   |   |   |   | 15 |   |
| 1 | 2.6 | 84 |   |   | 11 |   |   |   |   |   | 5 |   |
| 2 | 3.3 | 80 | 2 |   |   | 10 |   |   |   | 2 |   | 6 |
| 3 | 12.0 | 90 |   |   |   | 7 | 0.3 |   | 3 |   |   |   |
| 4 | 5.4 | 69 | 2 | 20 | 2 | 1 |   |   |   |   | 3 | 3 |
| 5 | 6.0 | 91 |   |   | 4 |   |   |   |   |   | 5 |   |

TABLE II

| Dye/Mixture | Dye/Mixture Content | Water | PG | DEG | NMP | CET | TBT | TDG | BDL | PHO | 2P | PI2 |
|---|---|---|---|---|---|---|---|---|---|---|---|---|
| 6 | 3.0 | 80 | 15 |   |   | 0.2 |   |   |   |   | 5 |   |
| 7 | 9.0 | 90 |   | 5 |   |   |   |   |   | 1.2 |   | 5 |
| 8 | 1.5 | 85 | 5 | 5 |   | 0.15 | 5.0 | 0.2 |   |   |   |   |
| 9 | 2.5 | 90 |   | 6 | 4 |   |   |   |   | 0.12 |   |   |
| 10 | 3.1 | 82 | 4 | 8 |   | 0.3 |   |   |   |   |   | 6 |
| 11 | 0.9 | 85 |   | 10 |   |   |   |   | 5 | 0.2 |   |   |
| 12 | 8.0 | 90 |   | 5 | 5 |   |   | 0.3 |   |   |   |   |
| 13 | 4.0 | 70 |   | 10 | 4 |   |   |   | 1 |   | 4 | 11 |
| 14 | 2.2 | 75 | 4 | 10 | 3 |   |   |   | 2 |   | 6 |   |
| 15 | 10.0 | 91 |   |   | 6 |   |   |   |   |   | 3 |   |
| 10 | 9.0 | 76 |   | 9 | 7 |   | 3.0 |   |   | 0.95 | 5 |   |
| 3 | 5.0 | 78 | 5 | 11 |   |   |   |   |   |   | 6 |   |
| 11 | 5.4 | 86 |   | 7 |   |   |   |   |   |   | 7 |   |
| 14 | 2.1 | 70 | 5 | 5 | 5 | 0.1 | 0.2 | 0.1 | 5 | 0.1 | 5 |   |
| 8 | 2.0 | 90 |   | 10 |   |   |   |   |   |   |   |   |
| 1 | 2 | 88 |   |   |   |   |   | 10 |   |   |   |   |
| 2 | 5 | 78 |   |   | 5 |   |   | 12 |   |   | 5 |   |
| 1 | 8 | 70 | 2 |   | 8 |   |   | 15 |   |   | 5 |   |
| 2 | 10 | 80 |   |   |   |   |   | 8 |   |   | 12 |   |
| 1 | 10 | 80 |   |   | 10 |   |   |   |   |   |   |   |

PG=propylene glycol

DEG=diethylene glycol

NMP=N-methyl pyrollidone

DMK=dimethylketone

IPA=isopropanol

MEOH=methanol

2P=2-pyrollidone

MIBK=methylisobutyl ketone

EXAMPLES 16–20

The method of Example 1 may be repeated except that in place of 4-aminophenoxyacetic acid the intermediates described in the second column Table III may be used to give the compounds shown in the final column of Table III.

TABLE III
| Example | Intermediate used in place of 4-aminophenoxyacetic acid in example 1 | Product |
|---|---|---|
| 16 | 2-amino-5-methyl benzoic acid | 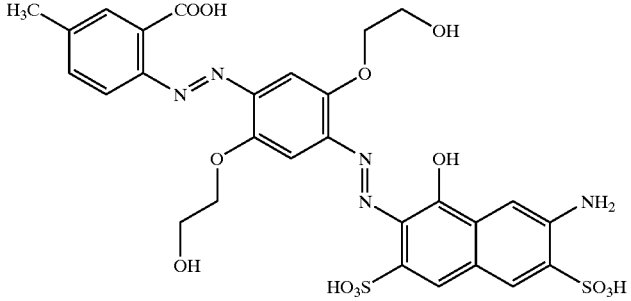 |
| 17 | 2-sulpho-4-methyl aniline | 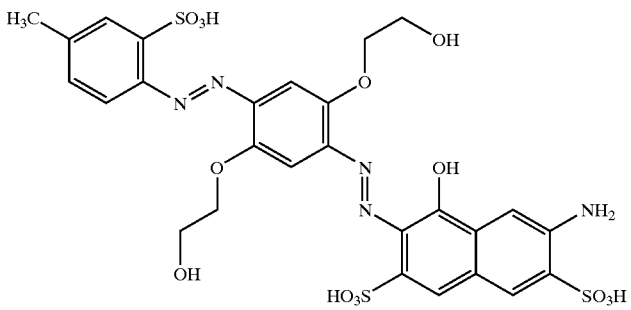 |
| 18 | 2-sulpho-4-methoxy aniline | 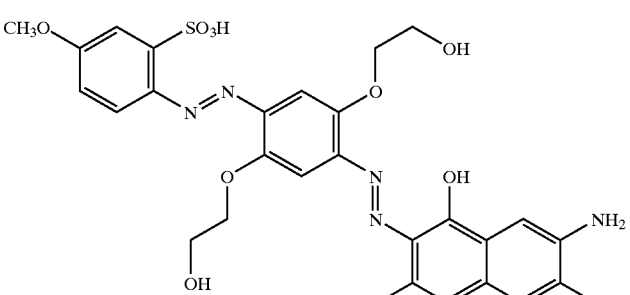 |
| 19 | 2-carboxy-4,5-dimethoxy aniline | 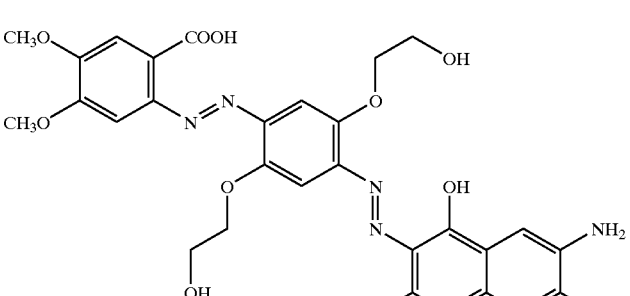 |

TABLE III-continued

| Example | Intermediate used in place of 4-aminophenoxyacetic acid in example 1 | Product |
|---|---|---|
| 20 | 2-methyl-4-sulpho aniline | 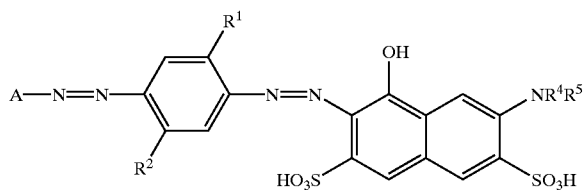 |

What is claimed is:

1. A compound of Formula (1) or a salt thereof:

Formula (1)

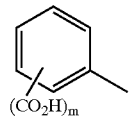

wherein:

A is optionally substituted phenyl;

$R^1$ and $R^2$ are each independently optionally substituted alkyl or optionally substituted alkoxy; and $R^4$ and $R^5$ are each independently H, optionally substituted alkyl or optionally substituted aryl;

provided that (i) at least one of $R^1$ and $R^2$ carries an —OH group; and (ii) A is not of the formula:

wherein m is 1, 2 or 3.

2. A compound according to claim 1 wherein $R^4$ and $R^5$ are H.

3. A compound according to claim 1 or 2 wherein the optional substituents which may be present on A are selected from —OH; optionally substituted amino; halo; ester; —CN; —NO$_2$; optionally substituted alkyl; optionally substituted alkoxy; —CO$_2$H; —SO$_3$H; —SO$_2$NR$^3$R$^3$; —OR$^3$; or —SR$^3$; wherein each $R^3$ independently is H or C$_{1-4}$-alkyl.

4. A compound according to any one of the preceding claims wherein $R^1$ and $R^2$ are each independently optionally substituted C$_{1-4}$-alkyl or optionally substituted C$_{1-4}$-alkoxy, provided that at least one of $R^1$ and $R^2$ carries an —OH group.

5. A compound according to any one of the preceding claims wherein both $R^1$ and $R^2$ carry an —OH group.

6. A compound according to any one of the preceding claims wherein m is 1 or 2; and one of $R^1$ and $R^2$ is —OC$_{1-4}$-alkyl—OH and the other is —OC$_{1-4}$-alkyl or —O—C$_{1-4}$-alkyl—OH.

7. An ink comprising a compound according to any one of the preceding claims and a liquid medium or a low melting point solid medium.

8. An ink according to claim 7 which contains a further colorant selected from black, cyan and yellow colorants.

9. A process for printing an image on a substrate comprising applying an ink containing a compound according to any one of claims 1 to 6 to the substrate by means of an ink jet printer.

10. A paper, an overhead projector slide or a textile material printed with an ink according to claim 7 or 8, a compound according to any one of claims 1 to 6 or by means of a process according to claim 9.

11. An ink jet printer cartridge, optionally refillable, containing an ink according to claim 7 or 8.

* * * * *

UNITED STATES PATENT AND TRADEMARK OFFICE
CERTIFICATE OF CORRECTION

PATENT NO. : 6,559,292 B1 Page 1 of 1
DATED : May 6, 2003
INVENTOR(S) : Mistry et al.

It is certified that error appears in the above-identified patent and that said Letters Patent is hereby corrected as shown below:

<u>Title page,</u>
Item [30], Foreign Application Priority Data, please delete:
"Sep. 7, 1999 (GB) ............................. 9921079"

Signed and Sealed this

Sixteenth Day of September, 2003

JAMES E. ROGAN
*Director of the United States Patent and Trademark Office*